United States Patent [19]

Berglund et al.

[11] 4,015,735
[45] Apr. 5, 1977

[54] MEANS FOR CHANGING THE POSITION OF A LOAD-CARRYING COMPONENT OF A TRANSPORT UNIT

[76] Inventors: Kjell Berglund, Revingevagen 4, S-240 35 Harlosa; Signar Nordlund, Bjarshog, S-212 90 Malmo, both of Sweden

[22] Filed: Mar. 7, 1975

[21] Appl. No.: 556,298

[30] Foreign Application Priority Data

Mar. 15, 1974 Sweden .............................. 7403485

[52] U.S. Cl. .............................. 214/313; 214/390; 280/43.23
[51] Int. Cl.² ........................................... B60P 3/00
[58] Field of Search .......................... 214/312–314, 214/315–317, 390, 506; 280/43.11, 43.23

[56] References Cited

UNITED STATES PATENTS

| | | | |
|---|---|---|---|
| 3,271,042 | 9/1966 | Flodin | 214/506 X |
| 3,910,435 | 10/1975 | Haag | 214/317 X |

*Primary Examiner*—Robert G. Sheridan
*Attorney, Agent, or Firm*—John J. Dennemeyer

[57] ABSTRACT

A device is disclosed for changing the position of a load-carrying component of a transport unit relative to a support surface on which the transport unit is movable, and in which the load-carrying component such as a chassis frame, is carried by at least one support leg which is provided with at least one contact member for the support surface which may be a wheel, caterpillar chains or a pontoon, or with at least one coupling device. The support leg is mounted on the load-carrying component through an articulation designed and arranged to allow swinging movement of the support leg relative to the load-carrying component. The support leg is connected to the load-carrying component through a power actuator unit which is designed and arranged to swing the support leg so as to cause the position of the load-carrying component to change relative to the support surface to an extent corresponding to the degree of angular motion of the support leg. One power actuator unit is designed and arranged to retain the support leg in its set position relative to the load-carrying component, and the other power actuator unit is designed and arranged to become loaded by the load-carrying component together with any load carried by said last-mentioned component.

12 Claims, 8 Drawing Figures

MEANS FOR CHANGING THE POSITION OF A LOAD-CARRYING COMPONENT OF A TRANSPORT UNIT

The present invention relates to means for changing the position of a load-carrying component of a transport unit relative to a support surface on which the transport unit is movable, and in which the load-carrying component, for instance a chassis frame, is carried by at least one support leg which is provided with at least one support surface contacting member, such as a wheel, caterpillar chains or a pontoon, or with at least one coupling device.

In previously known transport equipment the load-carrying unit, a frame or platform, is disposed at such a level above the support surface as to be afforded sufficient free travel clearance when the transport unit is being moved. Consequently loading is carried out by lifting the load from the support surface and placing it on the load-carrying unit, and unloading is effected by lifting the load from the unit and lowering it onto the support surface. Such loading and unloading operations require special load handling arrangements which consist either of automative vehicles or of hoists mounted on loading wharves or on the transport unit proper. In other words loading and unloading of the transport units can only be carried out if special automotive vehicles are at hand, if the transport vehicle is moved to special loading and unloading devices, or if hoists are mounted on the transport unit. Vehicle-carried hoists usually consist of cranes or of raisable and lowerable frameworks carried by the load-carrying unit. Cranes for this purpose, however, either have small lifting capacity or they infringe the load space and add to the dead weight of the vehicle where they are dimensioned for handling large loads. For raising and lowering the frameworks large size power actuators, usually hydraulic cylinders extending at oblique angles to the frameworks, are required, which will involve also the in this case the drawback of substantially increasing the dead weight of the transport unit.

The present invention has for its object to obviate these drawbacks and to provide a transport unit in which special lifting devices in the form of automotive vehicles of cranes, travelling winches and the like on the loading and unloading site or on the transport unit can be omitted. This object is accomplished according to the invention by imparting to the transport unit proper the features defined in the appended claims.

The invention will now be described more in detail with reference to the accompanying drawings, in which.

According to the invention, the transport unit, a yoke-frame wagon, a garbage removal or collection truck a cable wheel trailer or a tractive or automotive vehicle of any other type is designed in itself to carry out loading and unloading operations. In order to illustrate the invention, a tractive yoke-frame wagon 1 designed according to the invention will be described hereinafter by way of example.

The yoke-frame wagon 1 comprises a load-carrying unit 2 in the form of a U-shaped frame or undercarriage whose legs constitute the longitudinal side members 3 of the wagon, and whose intermediate portion constitutes a front-end cross member 4. The yoke-frame wagon 1 can be connected by means of a drawbar device 5 to a trailer coupling 6 (such as a ball-joint coupling) on a traction vehicle 7.

The drawbar device 5 is connected to the front end cross member 4 through articulations 8 and the power actuator so as to be swingable vertically relative to the load-carrying unit 2.

The ground supporting wheels 9 (or caterpillar chains not shown) of the yoke-frame wagon 1 are mounted on support legs 10 which are pivotally mounted at the rear ends of the side members 3 by articulations 11 and power actuators so as to be swingable vertically.

Figure 5:
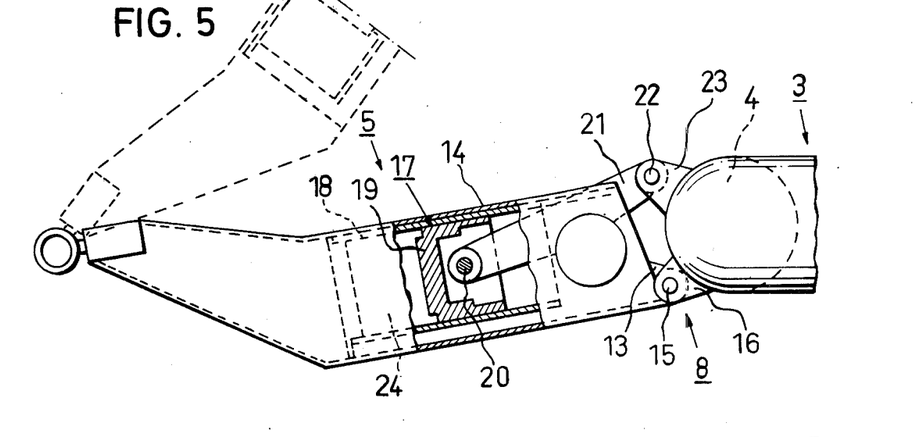
FIG. 5 is a side elevational view of a front-end articulation device comprised in the transport unit.
Figure 6:
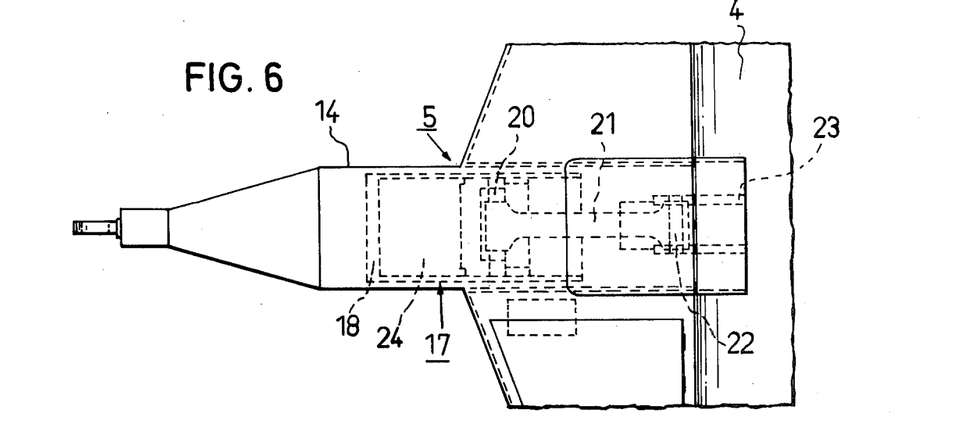
FIG. 6 is a top-plan view of the front-end articulation device of FIG. 5.

To afford a reliable connection between the drawbar device 5 and the load-carrying unit 2 the articulation 8 (FIGS. 5 and 6) comprises a flange or lug 13 which is disposed at the underside of a centrally disposed beam 14 of the drawbar device 5. To form a hinge pin 15 this flange or lug 13 has hinge elements (not shown) which cooperate with mating elements (not shown) mounted on lugs or flanges 16 disposed at the underside of the front-end cross member 4 of the U-shaped frame. Furthermore the drawbar device 5 and the load-carrying unit 2 are interconnected through a power unit or actuator 17. This actuator comprises a fluid cylinder 18 which is disposed within the central beam 14 and which comprises a displaceable piston 19 of the plunger type. Pivoted to the piston 19 by a pin 20 is an arm or connecting rod 21 having its opposite end connected through a pivot pin 22 to lugs or brackets 23 secured to the upper portion of the front-end cross member 4 of the load-carrying unit 2. The pressure chamber 24 of the cylinder 18 is connected through fluid lines (not shown) to at least one pressure-fluid supply (not shown) which is arranged to be controlled for displacing the piston 19 and for maintaining the latter in certain predetermined or any selected positions.

Figure 7:
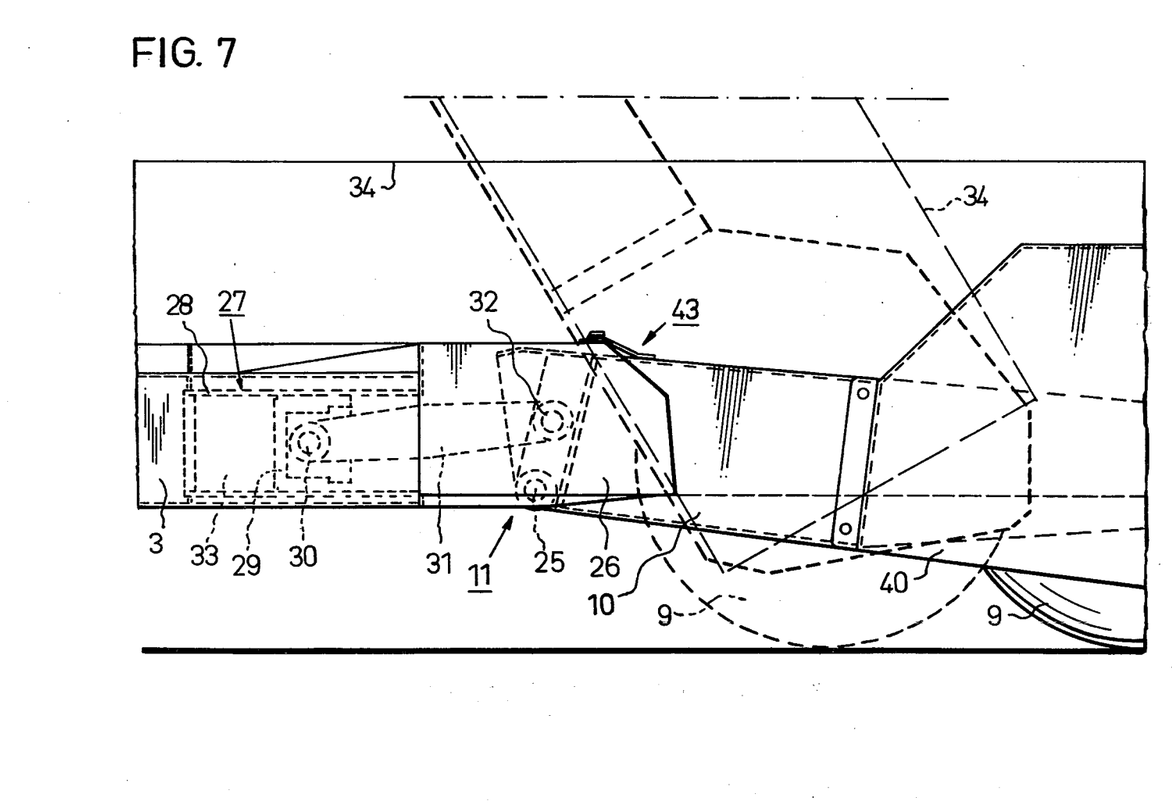
FIG. 7 is a side-elevational view illustrating a rear-end articulation device.

The articulation device 11 comprises a hinge or pivot pin 25 which connects the support leg 10 with the side member 3 of the U-shaped frame. This pivot pin 25 is mounted at the bottom of a rearwardly open portion 26 of the side member 3, the front-end portion of the support leg 10 projecting into the rearwardly facing opening of said portion 26 (FIG. 7). The support leg 10 is further interconnected with the load-carrying unit 2 by a power actuator 27. The latter comprises a fluid cylinder 28 which is mounted within the side member 3 and contains a displaceable piston 29 (of plunger type). Pivotally connected to the piston 29 by a pin 30 is an arm or connecting rod 31 having its opposite end pivotally connected to the support leg 10 by a pin 32. The pressure chamber 33 of the cylinder 28 is connected through fluid lines (not shown) to at least one pressure-fluid supply (not shown) which is arranged to be controlled for displacing the piston 29 and for maintaining the latter in certain predetermined or any selected positions. The power actuators 27 may be controlled in parallel or independently of each other. As indicated diagrammatically in FIGS. 1 to 4 the power actuators 17, 27 may be disposed above and outside the load-carrying unit 2, the drawbar device 5 and the support legs 10. The cylinder of power actuator 17, alternatively, could also be arranged lying within the front-end member 4, and the cylinder 28 of power actuator 27, as an alternative, could be disposed within the support legs 10.

Figure 1:
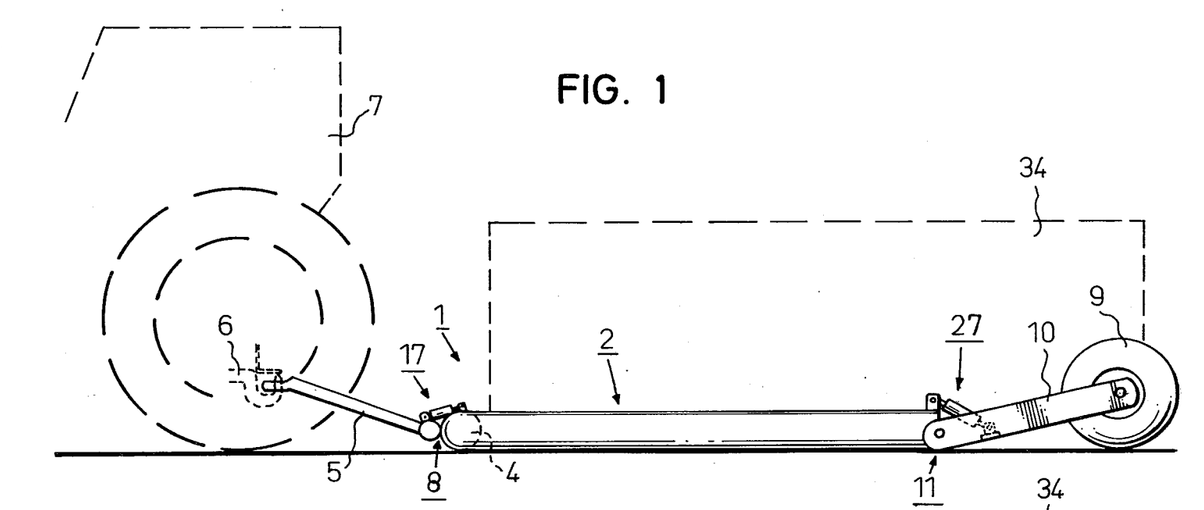
FIG. 1 is a side elevation view illustrating a transport unit according to the invention disposed in its position for loading and unloading operations.
Figure 2:
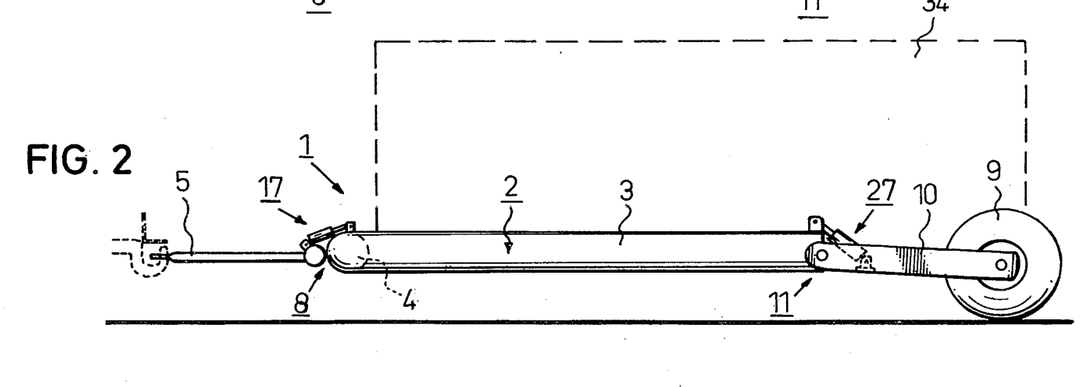
FIG. 2 is a side elevational view of the transport unit in its travelling position.

In view of the described construction of the yoke-frame wagon 1 the load-carrying unit 2 can be lowered to rest on the ground surface and thus may be moved so as to cause its frame to be disposed lower than any support elements (not shown), lateral wall portions, lateral flanges or the like of a load, preferably a container 34 (FIG. 1). The load rests on flanges 44 secured to the inner sides of the side members 3, said flanges being shown in FIG. 8. By swinging the drawbar device 5 and the support legs 10 by means of the power actuators 17, 27 the load-carrying unit 2, and thus the load 34, can be raised from the support surface until they will have reached the running level. Upon unloading the load-carrying unit 2 with the load is lowered again onto the support surface by causing the power actuators 17, 27 to swing the drawbar device 5 and the support legs 10 in the opposite sense.

Figure 8:
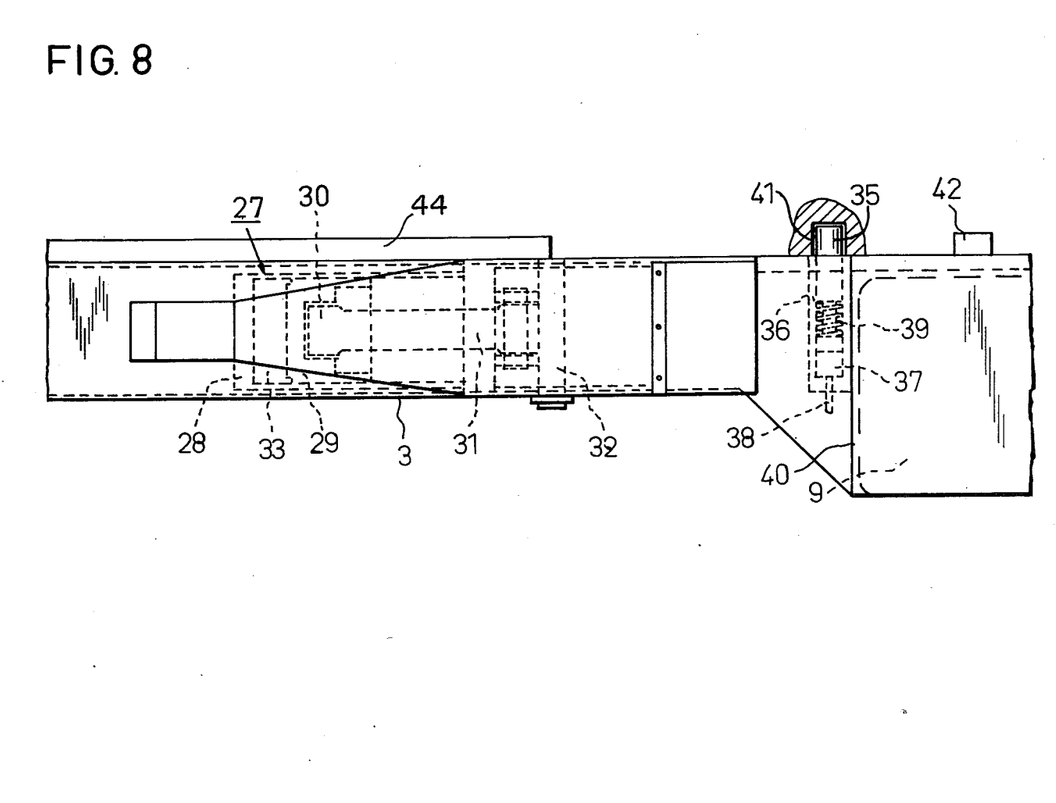
FIG. 8 is a top-plan view of the rear-end articulation device of FIG. 7.

To enable the load 34 to be tipped each supporting leg 10 has a pin 35 which is designed as a piston or plunger displaceable within a cylinder 36 (FIG. 8). The plunger 35 is adapted to be projected by a pressure fluid within the pressure chamber 37 of the cylinder (communicating with a pressure-fluid source through a fluid line 38) and to be withdrawn by a return spring 39. The cylinder 36 is preferably mounted on the wheel housing 40 of the yoke-frame wagon 1. The load 34 has a recess 41 mating with the pin or plunger and into which the pin 35 can be caused to project (FIG. 8). In addition, each support leg (or the wheel housing 40) could have a lug 42 which is disposed behind and/or beneath the pin or plunger 35, and which engages the bottom surface of the load 34 (container) to prevent any unintentional rearward-tipping of the latter.

Figure 3:
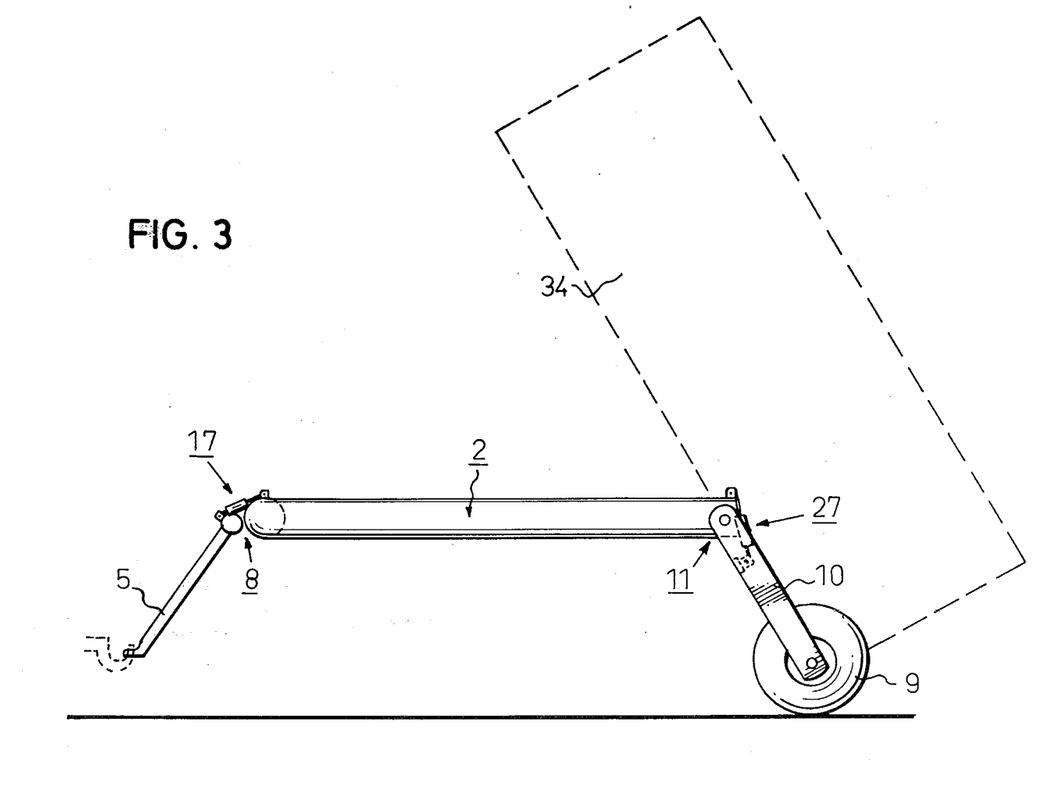
FIG. 3 is a side elevational view illustrating the transport unit with its load disposed in a tipping position.
Figure 4:
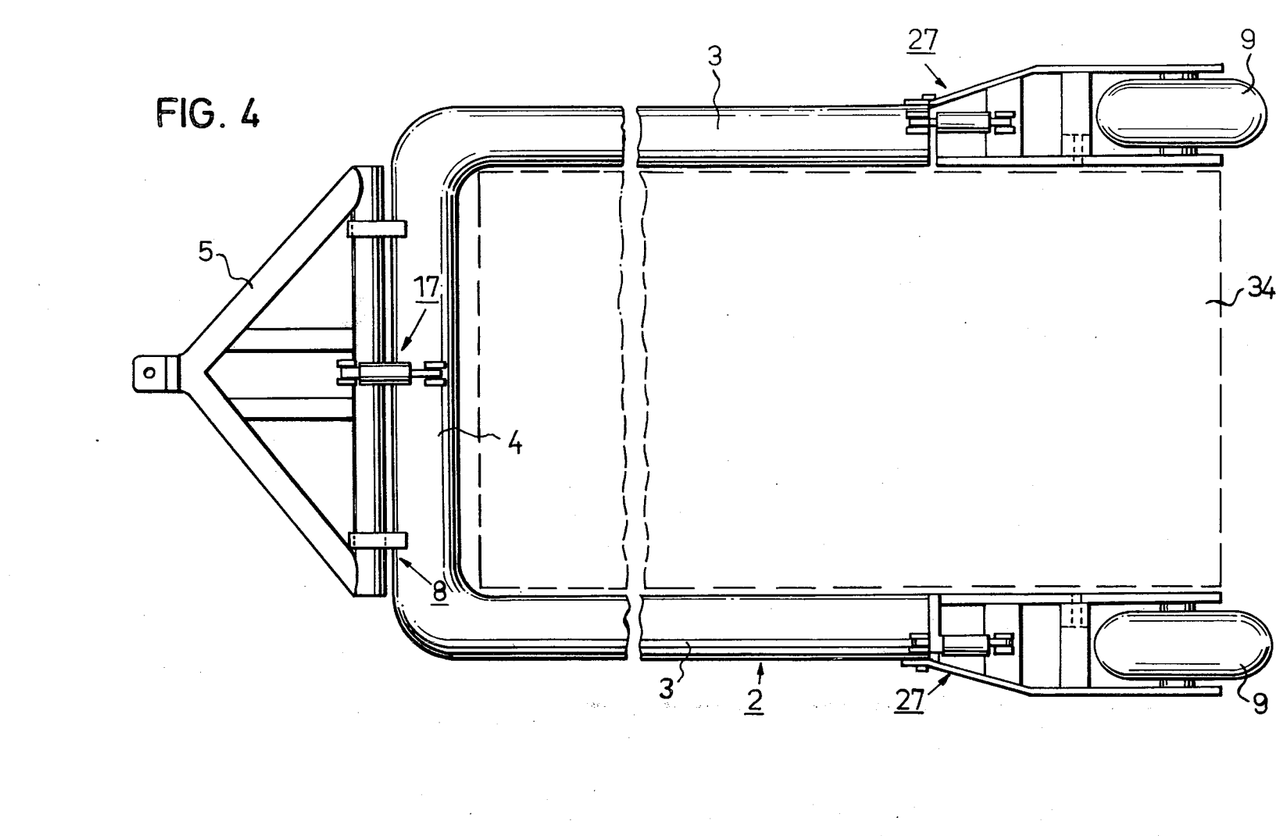
FIG. 4 illustrates the transport unit in a top-plan view.

If the load 34 is to be tipped, the pin plunger 35 is caused to project into the recess 41, after which the drawbar device 5 and the support legs 10 are pivoted by the power actuators 17, 27 so as to take up a position with a relatively great inclination relative to the load-carrying unit 2. During this pivoting movement, the load 34 is caused to follow the movement of the support legs on account of the positive connection between them, and the load is tipped into a position corresponding to the angle of inclination of the support legs 10 (FIG. 3). Thus, according to the invention, the yoke-frame wagon, due to a controlled positional change of its load-carrying unit 2, can be caused to carry out by itself the loading and unloading of a load, as well as a tipping of this load.

In the yoke-frame wagon 1 thus described by way of example, the support legs 10 may consist of hollow beam members, in which case the pivot pins 32 are suitably disposed within the respective beam members. The use of hollow beam members for constructing the load-carrying unit 2, the draw-bar device 5 and the support legs 10 also enables all lines for communicating pressure fluid and for electrical installations on the vehicle can be disposed to be protected within the beam members. Preferably the clearance space between side members 3 and support legs 10 is covered by a splash guard 43 when the yoke-frame wagon 1 is in its transport condition. Furthermore the side members 3 and/or the drawbar device 5 and/or the support legs 10 may be provided with limit stop elements (not shown) for limiting the paths of angular movement between such components. The side members 3 may be formed to cause their rear edges to act as a stop shoulder for the support legs 10, thereby obviating the necessity of separate limit stop elements for this purpose.

Since the yoke-frame wagon comprises hollow beam members, it is possible to dispose supply tanks (not shown) for pressure fluids and/or motor fuels within these members. Furthermore it is of advantage in certain cases to carry out the power units 27 for swinging the support legs 10, at least, in the form of two fluid cylinders (not shown), one being disposed on or within the load-carrying unit 2, and the other on or within each support leg 10. Pivoted to the pistons of such cylinders are levers having their opposite ends connected to a yoke (not shown) disposed between the load-carrying unit 2 and each support leg 10 and pivotally mounted on the pivot pin between the load-carrying unit 2 and the respective support leg 10. Such power units, although involving double cylinders and an extra yoke, will afford a kind of leverage which will, in certain cases, involve important advantages.

The principle of the invention, however, can be applied to many other kinds of vehicles for loads to be loaded and unloaded and/or in which operating appliances shall be movable into different positions of height. Examples of such vehicles are:

(a) agricultural vehicles carrying various agricultural appliances, such as a plough, a harrow and a sowing appliance (in such vehicles the load-carrying unit 2 may consist of interconnectible — possibly relatively articulated — elements, so that the length of the vehicle can be varied according to the number of appliances which can be connected in; (b) ploughing vehicles having snow-ploughing blades; (c) pontoon boats having arrangements for collecting waste oil dumped from seagoing vessels; (4) boat-transport vehicles, in which the load-carrying unit 2 has boat-chocks for carrying boat hulls.

In all the vehicles here described and indicated, the weight of the load can be indicated by an indicator device (not shown) which is associated with at least one of the power actuators to indicate the loading exerted by the load-carrying unit 2 on the actuator. In this way load-sensing data are obtained in a very simple way. The power actuator units can be controlled to operate the load-carrying unit 2, and thus the load, relative to the instantaneous vehicle speed. The power actuators, in addition, possibly through gyroscopic detection, can be controlled to cause the load-carrying unit instantaneously to take up an inclined position relative to the inclination of the support surface. Furthermore it is possible to control the power actuator units for steering the vehicle by causing the inclination of the load-carrying unit and the spacing between the support wheels to change upon swinging of one or more support legs relative to the other support legs. Thus the inventive principle provides for many advantages in connection with load-handling operations and working operations on the support surface, and instead of providing the vehicles with support wheels, caterpillar chains or pontoons, the vehicle in question can be carried on runners or rollers. In the arrangements exemplified hereinbefore the load has stationary carrier members or comprises portions beneath which the load-carrying unit 2 can be caused to lie for lifting. Such carrier members, fixed or displaceable flanges, alternatively could be arranged on the load-carrying unit proper. Also other elements of the arrangements here described and illustrated could be of any suitable other forms or arranged in any suitable other ways without thereby changing the intended function. Thus, for instance, the gripping devices 35 to 39 could be designed and arranged to engage the load 34 or any other portion thereof when the support leg 10 has been swung into a position in which it extends substantially parallel to the support surface or forms a small angle with the latter (FIG. 1). Furthermore the load-carrying unit 2 preferably has an abutment element in the vicinity of the support legs 10, such as an extension of, or a shoulder (not shown) on the pivot pin 25. This abutment element may be in the form of, or may comprise, a pivot roller (not shown).

What is claimed is:
1. A transport device comprising:
  a. a U-shaped main frame comprising two longitudinal, generally parallel side members, and a cross member connecting the side members at the front thereof, said side members having load engaging means thereon for supporting a load therebetween, the rear end of said U-shaped main frame being open to permit the rear portion of said load to project rearwardly of said members;
  b. a swingable fore frame member pivotally connected to said cross member;
  c. a pair of swingable rear frame members, one of said rear frame members being pivotally connected to the rear end of each of said side members and forming an extension thereof;
  d. first power actuating means connected between said cross member and said swingable fore frame, and operable for pivoting the foreward end of said main frame between raised and lowered positions;
  e. second power actuating means connected between the rear ends of said side members and said swingable rear frame members, and operable for pivoting the rear end of said main frame between raised and lowered positions, said swingable rear frame members extending downwardly at an angle from said side members when said rear end of said main frame is in a raised position, and pivoting upwardly toward a position wherein they are in general alignment with said side members as said rear end of said main frame pivots from its raised position toward its lowered position; and
  f. gripping means on at least one of said swingable rear frame members disposed rearwardly of the rear end of its associated side member, and adapted to engage said projecting rear portion of a load supported between side members when said rear end of said main frame is in a position beneath its raised position, whereby when said second power actuating means is operated to raise said rear end of said main frame said projecting rear portion of said load will be carried downwardly by said downwardly pivoting rear frame members, thereby effecting an upward tilting of the foreward end of said load.

2. A transport device as defined in claim 1, wherein said gripping means includes:
  a. a plunger mounted in said swingable rear frame member for movement toward and away from said load, said load having recess means therein for receiving said plunger; and
  b. a third power actuating means connected with said plunger, and operable to move it toward and away from said load.

3. A transport device as defined in claim 2, wherein a plunger and a third power actuating means is mounted on both of said rear frame members.

4. A transport device as defined in claim 1, further including lug means projecting inwardly on at least one of said swingable rear frame members for engaging the load and providing a stop for the load to prevent rearward sliding thereof when the load is tipped upwardly during downward pivoting of said rear frame members.

5. A transport device as defined in claim 1, wherein said first power actuating means and said second power actuating means both include a piston and a cylinder, and wherein said first power actuating means is operable separably from said second power actuating means.

6. A transport device as defined in claim 5, wherein said cylinder of said first power actuating means is formed rigidly within a cavity in said swingable fore frame member, and said cylinders of said second power actuating means are formed rigidly within hollows provided in the rear ends of said side frame members.

7. A transport device as defined in claim 1, wherein said swingable fore frame member and said swingable rear frame members all include cavities arranged to confront said U-shaped main frame, the forward end of said first power actuating means being disposed within the cavity in said swingable fore frame member, and the rear ends of said second power actuating means being disposed within the cavities in said swingable rear frame members.

8. A transport device as defined in claim 7, wherein the rear ends of said side members have hollow portions therein facing said cavities in said swingable rear frame members, and the forward ends of said second power actuating means are disposed within said hollow portions.

9. A transport device as defined in claim 8, wherein said second power actuating means each includes a piston and a cylinder, and said pistons and cylinders are substantially wholly received within their respective cavities and hollow portions.

10. A transport device as defined in claim 1, wherein said first and said second power actuating means are located above the pivotal connections of said swingable fore frame member and said swingable rear frame members, respectively, with said U-shaped main frame.

11. A transport device as defined in claim 1, wherein said first and said second power actuating means, said swingable fore frame member, said swingable rear frame members, and said U-shaped main frame are arranged whereby said U-shaped main frame can be lowered into a ground-engaging position.

12. A transport device as defined in claim 1, wherein said rear frame members are pivotally connected to said rear ends of said side members by pivot pins, and wherein said pivot pins have inwardly extending pivot rollers thereon engageable by said load during tilting of the load.

* * * * *